United States Patent
Jang et al.

(10) Patent No.: US 12,134,689 B2
(45) Date of Patent: Nov. 5, 2024

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Jeongmin Jang, Daejeon (KR); Tae Hoon Kim, Daejeon (KR); Chun Ho Park, Daejeon (KR); Da Eun Sung, Daejeon (KR); Yong Hee An, Daejeon (KR); Wangrae Cho, Daejeon (KR); Ho Hoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 726 days.

(21) Appl. No.: 17/299,256

(22) PCT Filed: Sep. 11, 2020

(86) PCT No.: PCT/KR2020/012281
§ 371 (c)(1),
(2) Date: Jun. 2, 2021

(87) PCT Pub. No.: WO2021/054679
PCT Pub. Date: Mar. 25, 2021

(65) Prior Publication Data
US 2022/0033633 A1 Feb. 3, 2022

(30) Foreign Application Priority Data

Sep. 18, 2019 (KR) .................. 10-2019-0114947
Sep. 8, 2020 (KR) .................. 10-2020-0114753

(51) Int. Cl.
| | |
|---|---|
| C08L 25/12 | (2006.01) |
| C08F 265/02 | (2006.01) |
| C08L 23/08 | (2006.01) |
| C08L 51/04 | (2006.01) |

(52) U.S. Cl.
CPC ............ C08L 25/12 (2013.01); C08F 265/02 (2013.01); C08L 23/0815 (2013.01); C08L 51/04 (2013.01); C08L 2201/08 (2013.01); C08L 2205/025 (2013.01); C08L 2205/035 (2013.01)

(58) Field of Classification Search
CPC .. C08L 51/003; C08L 51/04; C08L 25/00–18; C08L 23/00–24
See application file for complete search history.

(56) References Cited

U.S. PATENT DOCUMENTS

2006/0148992 A1 7/2006 Kim et al.
2016/0160017 A1 6/2016 Lee

FOREIGN PATENT DOCUMENTS

| | | | |
|---|---|---|---|
| CN | 104603198 A | 5/2015 | |
| EP | 3770214 A1 | 1/2021 | |
| JP | 4805464 B2 | 11/2011 | |
| JP | 2012214734 A | 11/2012 | |
| JP | 2016003284 A | 1/2016 | |
| KR | 10-2000-0055258 A | 9/2000 | |
| KR | 10-2004-0090117 A | 10/2004 | |
| KR | 10-2004-0105464 A | 12/2004 | |
| KR | 10-2006-0065980 A | 6/2006 | |
| KR | 10-2015-0008775 A | 1/2015 | |
| KR | 10-2015-0068313 A | 6/2015 | |
| KR | 10-2016-0057601 A | 5/2016 | |
| KR | 10-2016-0066979 A | 6/2016 | |
| KR | 2018-0073062 A | 7/2018 | |
| KR | 10-1974164 B1 | 4/2019 | |
| WO | WO2014-007442 A1 | 1/2014 | |
| WO | WO-2018114979 A1 * | 6/2018 | ............ C08L 23/12 |

OTHER PUBLICATIONS

Partial machine translation of JP 2016-003284 A (Year: 2016).*
Partial machine translation of KR 2018-0073062 A (Year: 2018).*
Extended European Search Report for EP Application No. 20865196. 8, mailed Nov. 25, 2021.

* cited by examiner

*Primary Examiner* — Kregg T Brooks

(57) ABSTRACT

The present invention relates to a thermoplastic resin composition, a method of preparing the same, and a molded article manufactured using the same. More specifically, the thermoplastic resin composition of the present invention includes 100 parts by weight of a base resin consisting of an acrylate-aromatic vinyl compound-vinyl cyanide compound graft copolymer (A-1) containing acrylate rubber having an average particle diameter of 0.05 to 0.15 μm as a core, an acrylate-aromatic vinyl compound-vinyl cyanide compound graft copolymer (A-2) containing acrylate rubber having an average particle diameter of 0.3 to 0.6 μm as a core, an aromatic vinyl polymer (B-1), and a heat-resistant aromatic vinyl polymer (B-2); and 0.5 to 10 parts by weight of a polyolefin elastomer (C). Within this range, the thermoplastic resin composition may have a heat deflection temperature (HDT) of 89° C. or more.

9 Claims, No Drawings

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATIONS

This application is a National Phase of International Application No. PCT/KR2020/012281 which claims priority to Korean Patent Application No. 10-2019-0114947, filed on Sep. 18, 2019 and Korean Patent Application No. 10-2020-0114753, re-filed on Sep. 8, 2020, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article manufactured using the same. More particularly, the present invention relates to a thermoplastic resin composition that satisfies both economics and chemical resistance and has excellent heat resistance and impact strength by including specific additives at low cost compared to conventional additives for increasing chemical resistance, a method of preparing the thermoplastic resin composition, and a molded article manufactured using the thermoplastic resin composition.

BACKGROUND ART

Acrylate compound-styrene-acrylonitrile copolymers (hereinafter referred to as "ASA resins") have excellent weather resistance, light resistance, colorability, chemical resistance, and impact resistance, and thus have been used in various fields such as automobiles, miscellaneous goods, and construction materials. In particular, there is increasing demand for aesthetics in the field of exterior materials, and accordingly, attempts to improve aesthetics by finishing substrates such as PVC, wood, and steel plates with ASA resins are underway.

Compared to conventional PVC or PP resins, ASA resins have excellent processing stability and are eco-friendly materials that do not contain heavy metal components, and thus are attracting considerable attention in the field of exterior materials such as decorative sheets.

However, ASA resins have problems such as generation of pressing marks during storage and deformation of a sheet during processing. In particular, when an ASA resin is adhered to a substrate, the ASA resin may be dissolved by a solvent contained in the adhesive.

Therefore, a thermoplastic resin composition having improved chemical resistance in addition to excellent appearance needs to be developed.

RELATED ART DOCUMENTS

Patent Documents (Patent Document 1) KR 2006-0065980 A

DISCLOSURE

Technical Problem

Therefore, the present invention has been made in view of the above problems, and it is one object of the present invention to provide a thermoplastic resin composition that satisfies both economics and chemical resistance and has excellent heat resistance and impact strength by including specific additives at low cost compared to conventional additives for increasing chemical resistance, a method of preparing the thermoplastic resin composition, and a molded article manufactured using the thermoplastic resin composition.

The above and other objects can be accomplished by the present disclosure described below.

Technical Solution

In accordance with one aspect of the present invention, provided is a thermoplastic resin composition including 100 parts by weight of a base resin consisting of an acrylate-aromatic vinyl compound-vinyl cyanide compound graft copolymer (A-1) containing acrylate rubber having an average particle diameter of 0.05 to 0.15 µm as a core, an acrylate-aromatic vinyl compound-vinyl cyanide compound graft copolymer (A-2) containing acrylate rubber having an average particle diameter of 0.3 to 0.6 µm as a core, an aromatic vinyl polymer (B-1), and a heat-resistant aromatic vinyl polymer (B-2); and 0.5 to 10 parts by weight of a polyolefin elastomer (C), wherein the thermoplastic resin composition has a heat deflection temperature (HDT) of 89° C. or more.

In accordance with another aspect of the present invention, provided is a method of preparing a thermoplastic resin composition, the method including kneading and extruding, under conditions of 200 to 330° C. and 100 to 500 rpm, 100 parts by weight of a base resin consisting of an acrylate-aromatic vinyl compound-vinyl cyanide compound graft copolymer (A-1) containing acrylate rubber having an average particle diameter of 0.05 to 0.15 µm as a core, an acrylate-aromatic vinyl compound-vinyl cyanide compound graft copolymer (A-2) containing acrylate rubber having an average particle diameter of 0.3 to 0.6 µm as a core, an aromatic vinyl polymer (B-1), and a heat-resistant aromatic vinyl polymer (B-2); and 0.5 to 10 parts by weight of a polyolefin elastomer (C), wherein the thermoplastic resin composition has a heat deflection temperature (HDT) of 89° C. or more.

In accordance with still another aspect of the present invention, provided is a molded article including the thermoplastic resin composition.

In accordance with yet another aspect of the present invention, provided is a thermoplastic resin composition including 100 parts by weight of a base resin consisting of 1 to 30% by weight of an acrylate-aromatic vinyl compound-vinyl cyanide compound graft copolymer (A-1) containing acrylate rubber having an average particle diameter of 0.05 to 0.15 µm as a core, 5 to 50% by weight of an acrylate-aromatic vinyl compound-vinyl cyanide compound graft copolymer (A-2) containing acrylate rubber having an average particle diameter of 0.3 to 0.6 µm as a core, 40 to 85% by weight of an aromatic vinyl polymer (B-1), and 5 to 50% by weight of a heat-resistant aromatic vinyl polymer (B-2); and 0.5 to 10 parts by weight of a polyolefin elastomer (C).

Advantageous Effects

According to the present invention, a thermoplastic resin composition that satisfies both economics and chemical resistance and has excellent heat resistance and impact strength by including specific additives at low cost compared to conventional additives for increasing chemical resistance, a method of preparing the thermoplastic resin composition, and a molded article manufactured using the thermoplastic resin composition can be provided.

BEST MODE

Hereinafter, a thermoplastic resin composition, a method of preparing the same, and a molded article manufactured using the same according to the present invention will be described in detail.

The present inventors confirmed that, when a specific low-cost polymer elastomer was included within a specific range instead of a conventional additive for increasing chemical resistance, such as polymethyl methacrylate, to increase the chemical resistance of an ASA resin, the chemical resistance, heat resistance, and impact strength of the resin were increased while improving economics. In addition, the present inventors confirmed that the resin composition of the present invention was suitable for the field of exterior materials, such as decorative sheets, requiring high chemical resistance, heat resistance, and impact strength. Based on these results, the present inventors conducted further studies to complete the present invention.

The thermoplastic resin composition of the present invention includes 100 parts by weight of a base resin consisting of an acrylate-aromatic vinyl compound-vinyl cyanide compound graft copolymer (A-1) containing acrylate rubber having an average particle diameter of 0.05 to 0.15 μm as a core, an acrylate-aromatic vinyl compound-vinyl cyanide compound graft copolymer (A-2) containing acrylate rubber having an average particle diameter of 0.3 to 0.6 μm as a core, an aromatic vinyl polymer (B-1), and a heat-resistant aromatic vinyl polymer (B-2); and 0.5 to 10 parts by weight of a polyolefin elastomer (C). Within this range, the thermoplastic resin composition has a heat deflection temperature (HDT) of 89° C. or more. In this case, the thermoplastic resin composition includes a specific additive at low cost compared to conventional additives for increasing chemical resistance, and thus has excellent economics, chemical resistance, heat resistance, and impact strength.

In addition, the thermoplastic resin composition of the present invention may include 100 parts by weight of a base resin consisting of 1 to 30% by weight of an acrylate-aromatic vinyl compound-vinyl cyanide compound graft copolymer (A-1) containing acrylate rubber having an average particle diameter of 0.05 to 0.15 μm as a core, 5 to 50% by weight of an acrylate-aromatic vinyl compound-vinyl cyanide compound graft copolymer (A-2) containing acrylate rubber having an average particle diameter of 0.3 to 0.6 μm as a core, 40 to 85% by weight of an aromatic vinyl polymer (B-1), and 5 to 50% by weight of a heat-resistant aromatic vinyl polymer (B-2); and 0.5 to 10 parts by weight of a polyolefin elastomer (C). In this case, economics, impact strength, chemical resistance, and heat resistance may be excellent.

Hereinafter, each component constituting the thermoplastic resin composition of the present invention will be described in detail.

A-1) Acrylate-Aromatic Vinyl Compound-Vinyl Cyanide Compound Graft Copolymer

For example, the graft copolymer (A-1) may include acrylate rubber having an average particle diameter of 0.05 to 0.15 μm, preferably 0.1 to 0.15 μm, more preferably 0.12 to 0.15 μm, most preferably 0.12 to 0.14 μm. Within this range, a finally prepared thermoplastic resin composition may have excellent weather resistance and impact strength.

In this description, an average particle diameter may be measured by dynamic light scattering, and specifically, may be measured using Nicomp 380 (manufacturer: PSS).

In addition, in this description, the average particle diameter may refer to an arithmetic average particle diameter in a particle size distribution measured by dynamic light scattering, and specifically, may refer to a scattering intensity average particle diameter.

For example, the graft copolymer (A-1) may be included in an amount of 1 to 30% by weight, preferably 1 to 20% by weight, more preferably 5 to 15% by weight, most preferably 5 to 10% by weight, based on the weight of a base resin. Within this range, weather resistance, fluidity, tensile strength, and impact strength may be excellent.

For example, the graft copolymer (A-1) may be included in a lesser amount than the graft copolymer (A-2). The weight ratio of the graft copolymer (A-1) to the graft copolymer (A-2) is preferably 1:1.1 to 1:5, more preferably 1:1.2 to 1:4, still more preferably 1:1.2 to 1:3, most preferably 1:1.5 to 1:2.5. Within this range, weather resistance, fluidity, and impact strength may be excellent.

For example, the graft copolymer (A-1) may include 40 to 60% by weight of acrylate rubber, 25 to 45% by weight of an aromatic vinyl compound, and 10 to 20% by weight of a vinyl cyanide compound. Within this range, weather resistance, fluidity, and impact strength may be excellent.

As a preferred example, the graft copolymer (A-1) may include 45 to 55% by weight of acrylate rubber, 30 to 50% by weight of an aromatic vinyl compound, and 5 to 20% by weight of a vinyl cyanide compound. Within this range, weather resistance, fluidity, and impact strength may be excellent.

As a more preferred example, the graft copolymer (A-1) may include 45 to 55% by weight of acrylate rubber, 30 to 40% by weight of an aromatic vinyl compound, and 10 to 20% by weight of a vinyl cyanide compound. Within this range, weather resistance, fluidity, and impact strength may be excellent.

In this description, a polymer including certain compounds refers to a polymer prepared by polymerizing the compounds, and the units of the prepared polymer are derived from the compounds.

For example, the graft copolymer (A-1) may be prepared by emulsion polymerization. In this case, chemical resistance, weather resistance, fluidity, tensile strength, and impact strength may be excellent.

Emulsion graft polymerization methods commonly practiced in the art to which the present invention pertains may be used as the emulsion polymerization method of the present invention without particular limitation.

For example, the acrylate may include one or more selected from the group consisting of alkyl acrylates containing an alkyl group having 2 to 8 carbon atoms. The acrylate is preferably an alkyl acrylate containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

A-2) Acrylate-Aromatic Vinyl Compound-Vinyl Cyanide Compound Graft Copolymer

For example, the graft copolymer (A-2) may include acrylate rubber having an average particle diameter of 0.3 to 0.6 μm, preferably 0.35 to 0.5 μm, more preferably 0.4 to 0.5 μm, most preferably 0.45 to 0.50 μm. Within this range, weather resistance may be good, and fluidity and mechanical strength such as impact strength may be excellent.

For example, the graft copolymer (A-2) may be included in an amount of 5 to 50% by weight, preferably 5 to 40% by weight, more preferably 10 to 30% by weight, most preferably 11 to 25% by weight, based on the weight of a base resin. Within this range, weather resistance, fluidity, and impact strength may be excellent.

For example, the graft copolymer (A-2) may include 40 to 60% by weight of acrylate rubber, 25 to 45% by weight of an aromatic vinyl compound, and 10 to 20% by weight of a vinyl cyanide compound. Within this range, weather resistance, fluidity, and impact strength may be excellent.

As a preferred example, the graft copolymer (A-2) may include 45 to 55% by weight of acrylate rubber, 30 to 40% by weight of an aromatic vinyl compound, and 10 to 20% by weight of a vinyl cyanide compound. Within this range, weather resistance, fluidity, and impact strength may be excellent.

For example, the graft copolymer (A-2) may be prepared by emulsion polymerization. In this case, weather resistance, fluidity, tensile strength, and impact strength may be excellent.

Emulsion graft polymerization methods commonly practiced in the art to which the present invention pertains may be used as the emulsion polymerization method of the present invention without particular limitation.

B-1) Aromatic Vinyl Polymer

For example, the aromatic vinyl polymer (B-1) may be included in an amount of 40 to 85% by weight, preferably 50 to 80% by weight, more preferably 60 to 85% by weight or 55 to 75% by weight, most preferably 60 to 70% by weight. Within this range, fluidity, weather resistance, and colorability may be excellent while reducing the degree of yellowing.

For example, the aromatic vinyl polymer (B-1) may be an aromatic vinyl compound-vinyl cyanide compound copolymer. In this case, chemical resistance and fluidity may be excellent.

The aromatic vinyl polymer (B-1) preferably includes 65 to 80% by weight of an aromatic vinyl compound and 20 to 35% by weight of a vinyl cyanide compound. Within this range, chemical resistance, processability, and impact strength may be excellent.

For example, the aromatic vinyl polymer (B-1) has a weight average molecular weight of 100,000 to 210,000 g/mol, preferably 120,000 to 200,000 g/mol, more preferably 150,000 to 200,000 g/mol. Within this range, fluidity and chemical resistance may be excellent.

In this description, unless otherwise defined, weight average molecular weight may be measured using gel permeation chromatography (GPC, Waters Breeze). As a specific example, weight average molecular weight may be measured using tetrahydrofuran (THF) as an eluate through gel permeation chromatography (GPC, Waters Breeze). In this case, weight average molecular weight is obtained as a relative value to a standard polystyrene (PS) specimen.

As a preferred example, the aromatic vinyl compound-vinyl cyanide compound copolymer may be a styrene-acrylonitrile copolymer (SAN resin). In this case, fluidity may be excellent.

For example, the aromatic vinyl polymer (B-1) may be prepared by solution polymerization or bulk polymerization. In this case, heat resistance and fluidity may be excellent.

Solution polymerization and bulk polymerization commonly practiced in the art to which the present invention pertains may be used in the present invention without particular limitation.

B-2) Heat-Resistant Aromatic Vinyl Polymer

For example, the heat-resistant aromatic vinyl polymer (B-2) may be included in an amount of 5 to 50% by weight, preferably 5 to 40% by weight, more preferably 10 to 30% by weight, most preferably 10 to 20% by weight. Within this range, heat resistance and chemical resistance may be excellent.

In this description, polymers commonly referred to as heat-resistance aromatic vinyl polymers in the art to which the present invention pertains may be used as the heat-resistant aromatic vinyl polymer of the present invention without particular limitation. Specifically, the heat-resistance aromatic vinyl polymer refers to an aromatic vinyl polymer including a monomer, i.e., a heat-resistant monomer, having a higher glass transition temperature (based on a polymer) than a styrene monomer.

For example, the heat-resistant monomer may include one or more selected from the group consisting of alpha-methylstyrene and maleimide-based compounds. For example, the maleimide-based compounds may include one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl) maleimide, 2-methyl-N-phenyl maleimide, N-(4-bromophenyl) maleimide, N-(4-nitrophenyl) maleimide, N-(4-hydroxyphenyl) maleimide, N-(4-methoxyphenyl) maleimide, N-(4-carboxyphenyl) maleimide, and N-benzyl maleimide, preferably alpha-methylstyrene.

The heat-resistant aromatic vinyl polymer (B-2) preferably includes one or more selected from the group consisting of alpha-methylstyrene-vinyl cyanide compound copolymers and maleimide-based compound-aromatic vinyl compound copolymers, more preferably alpha-methylstyrene-vinyl cyanide compound copolymers, most preferably alpha-methylstyrene-acrylonitrile copolymers. In this case, heat resistance and impact strength may be excellent.

The alpha-methylstyrene-vinyl cyanide compound copolymer preferably includes 50 to 80% by weight of alpha-methylstyrene and 20 to 50% by weight of a vinyl cyanide compound, more preferably 55 to 75% by weight of alpha-methylstyrene and 25 to 45% by weight of a vinyl cyanide compound, most preferably 60 to 75% by weight of alpha-methylstyrene and 25 to 40% by weight of a vinyl cyanide compound. As a preferred example, 60 to 70% by weight of alpha-methylstyrene, 5 to 10% by weight of styrene, and 20 to 30% by weight of acrylonitrile may be included. As another preferred example, 65 to 70% by weight of alpha-methylstyrene, 5 to 10% by weight of styrene, and 25 to 30% by weight of acrylonitrile may be included. Within this range, heat resistance may be excellent.

The alpha-methylstyrene-vinyl cyanide compound copolymer preferably has a weight average molecular weight of 80,000 to 150,000 g/mol, more preferably 80,000 to 120,000 g/mol. Within this range, heat resistance may be excellent.

The alpha-methylstyrene-vinyl cyanide compound copolymer preferably has a glass transition temperature of 110 to 150° C., more preferably 110 to 140° C. Within this range, heat resistance may be excellent.

In this description, glass transition temperature (Tg) may be measured using a differential scanning calorimeter (DSC), as a specific example, a differential scanning calorimeter from TA Instruments Co.

The maleimide-based compound-aromatic vinyl compound copolymers preferably include one or more selected from the group consisting of maleimide-based compound-styrene copolymers and maleimide-based compound-styrene-vinyl cyanide compound copolymers, more preferably maleimide-based compound-styrene copolymers, most preferably N-substituted maleimide compound-styrene-maleic anhydride copolymers. Within this range, heat resistance and impact strength may be excellent.

For example, the maleimide-based compound may be included in an amount of 30 to 70% by weight, preferably 45 to 55% by weight, in the heat-resistant aromatic vinyl polymer. Within this range, heat resistance and impact strength may be excellent.

For example, the aromatic vinyl compound may be included in an amount of 25 to 65% by weight, preferably 40 to 50% by weight, in the heat-resistant aromatic vinyl polymer. Within this range, heat resistance and impact strength may be excellent.

For example, the vinyl cyanide compound and the maleic anhydride may each be included in an amount of 1 to 30% by weight, preferably 1 to 10% by weight, in the heat-resistant aromatic vinyl polymer. Within this range, heat resistance and impact strength may be excellent.

For example, the heat-resistant aromatic vinyl polymer (B-2) may be prepared by solution polymerization or bulk polymerization. In this case, heat resistance and fluidity may be excellent.

Solution polymerization and bulk polymerization commonly practiced in the art to which the present invention pertains may be used in the present invention without particular limitation.

C) Polyolefin Elastomer

The polyolefin elastomer (C) preferably includes one or more selected from the group consisting of ethylene-alpha-olefin copolymers (elastomers) and linear low-density polyethylenes (LLDPEs), more preferably one or more selected from the group consisting of linear low-density polyethylenes (LLDPEs), an ethylene-1-butene elastomer (EBR), an ethylene-1-pentene elastomer (EPR), an ethylene-1-heptene elastomer (HER), and an ethylene-1-octene elastomer (EOR), most preferably one or more selected from the group consisting of an ethylene-1-octene elastomer (EOR) and an ethylene-1-butene elastomer (EBR). Within this range, chemical resistance, impact strength, and heat resistance may be improved.

The polyolefin elastomer (C) preferably has a melt index (190° C., 2.16 kg) of 0.3 to 20 g/10 minutes, more preferably 0.5 to 10 g/10 minutes, still more preferably 1 to 6 g/10 minutes, most preferably 1 to 5 g/10 minutes. Within this range, chemical resistance, impact strength, and heat resistance may be improved.

For example, the polyolefin elastomer (C) may have a weight average molecular weight of 60,000 to 120,000 g/mol, preferably 80,000 to 110,000 g/mol, more preferably 90,000 to 110,000 g/mol. Within this range, chemical resistance, impact strength, and heat resistance may be improved.

The polyolefin elastomer (C) preferably includes 50 to 90% by weight of ethylene; and 10 to 50% by weight of butene, pentene, heptene, or octene, more preferably 60 to 90% by weight of ethylene; and 10 to 40% by weight of butene, pentene, heptene, or octene, most preferably 60 to 70% by weight of ethylene; and 30 to 40% by weight of butene, pentene, heptene, or octene. Within this range, chemical resistance, impact strength, and heat resistance may be further improved.

The polyolefin elastomer (C) preferably has a density of 0.85 to 0.89, more preferably 0.856 to 0.887, still more preferably 0.860 to 0.867, most preferably 0.860 to 0.864. Within this range, chemical resistance, impact strength, and heat resistance may be improved.

As a preferred example, the polyolefin elastomer (C) may be an ethylene-butene elastomer including 10 to 40% by weight of butene and having a weight average molecular weight of 60,000 to 120,000 g/mol and a density of 0.860 to 0.887. As a more preferred example, the polyolefin elastomer (C) may be an ethylene-butene elastomer including 30 to 40% by weight of butene and having a weight average molecular weight of 90,000 to 110,000 g/mol and a density of 0.860 to 0.864. Within this range, chemical resistance, impact strength, and heat resistance may be greatly improved.

In this description, density measurement methods commonly used in the art to which the present invention pertains may be used to measure density. As a specific example, density may be measured according to ASTM D-792.

For example, based on 100 parts by weight of a base resin, the polyolefin elastomer (C) may be included in an amount of 0.5 to 10 parts by weight, preferably 0.5 to 8 parts by weight, more preferably 0.5 to 5 parts by weight, most preferably 2 to 4 parts by weight. Within this range, chemical resistance, impact strength, and heat resistance may be improved.

For example, the polyolefin elastomer (C) may be prepared by bulk polymerization or solution polymerization, preferably solution polymerization. As a specific example, polymerization may be performed at a polymerization temperature of 120 to 130° C. using a metallocene catalyst in hexane as a solvent.

E) Other Additives

For example, the thermoplastic resin composition of the present invention may further include one or more additives selected from the group consisting of antioxidants, UV stabilizers, fluorescence brightening agents, lubricants, chain extenders, release agents, pigments, dyes, antibacterial agents, processing aids, metal inactivators, smoke inhibitors, inorganic fillers, glass fibers, anti-friction agents, and anti-wear agents. For example, the additives may be included in an amount of 0.1 to 5 parts by weight, preferably 0.1 to 3 parts by weight, more preferably 0.1 to 1 part by weight based on 100 parts by weight of a base resin. In this case, physical properties may be improved, and manufacturing cost may be reduced, thereby improving economics.

The thermoplastic resin composition of the present invention preferably has an Izod impact strength (¼", 23° C.) of 6 kgf·cm/cm$^2$ or more, 6 to 15 kgf·cm/cm$^2$, or 9 to 12 kgf·cm/cm$^2$ as measured according to ASTM D256. Within this range, balance between chemical resistance, impact strength, and heat resistance may be excellent.

The thermoplastic resin composition of the present invention preferably has a melt index (220° C., 10 kg) of 9 g/10 minutes or more, 9 to 16 g/10 minutes, or 9 to 15 g/10 minutes as measured according to ASTM D1238. Within this range, balance between chemical resistance, impact strength, and heat resistance may be excellent.

The thermoplastic resin composition of the present invention preferably has a hardness (ASTM D785, R-scale) of less than 116, or 112 or more and less than 116. Within this range, balance between chemical resistance, impact strength, and heat resistance may be excellent.

The thermoplastic resin composition of the present invention preferably has a heat deflection temperature (HDT) of 89.6° C. or more, more preferably 89.8° C. or more, still more preferably 90° C. or more, most preferably 90.1° C. or more as measure according to ASTM D648. Within this range, balance between chemical resistance, impact strength, and heat resistance may be excellent.

Hereinafter, a method of preparing the thermoplastic resin composition of the present invention and a molded article including the same will be described. When describing the method and the molded article according to the present invention, all descriptions of the above-described thermoplastic resin composition are included.

Method of Preparing Thermoplastic Resin Composition

The method of preparing a thermoplastic resin composition according to the present invention preferably includes a step of kneading and extruding, under conditions of 200 to 330° C. and 100 to 500 rpm, 100 parts by weight of a base resin consisting of an acrylate-aromatic vinyl compound-vinyl cyanide compound graft copolymer (A-1) containing acrylate rubber having an average particle diameter of 0.05 to 0.15 μm as a core, an acrylate-aromatic vinyl compound-vinyl cyanide compound graft copolymer (A-2) containing acrylate rubber having an average particle diameter of 0.3 to 0.6 μm as a core, an aromatic vinyl polymer (B-1), and a heat-resistant aromatic vinyl polymer (B-2); and 0.5 to 10 parts by weight of a polyolefin elastomer (C). Within this range, the thermoplastic resin composition may have a heat deflection temperature (HDT) of 89° C. or more. In this case, the prepared thermoplastic resin composition includes a specific additive at low cost compared to conventional additives for increasing chemical resistance, and thus has excellent economics, chemical resistance, heat resistance, and impact strength.

For example, when the kneading step is performed, the base resin may be kneaded, and then a polymer plasticizer may be added and then kneaded. As another example, the base resin and the polymer plasticizer may be kneaded at the same time.

For example, the kneading and extruding step may be performed using a single-screw extruder, a twin-screw extruder, or a Banbury mixer. In this case, a composition may be uniformly dispersed, and thus compatibility may be excellent.

For example, the kneading and extruding step may be performed at a barrel temperature of 150 to 330° C., 180 to 300° C., 180 to 280° C., or 200 to 250° C. In this case, throughput per unit time may be appropriate, and melt kneading may be sufficiently performed. In addition, thermal decomposition of a resin component may be prevented.

For example, the kneading and extruding step may be performed at a screw rotation rate of 50 to 400 rpm, 100 to 350 rpm, 100 to 300 rpm, 120 to 300 rpm, or 150 to 250 rpm. In this case, throughput per unit time may be appropriate, and thus process efficiency may be improved and excessive cutting may be prevented.

Molded Article

For example, the molded article of the present invention may be manufactured using the thermoplastic resin composition of the present invention. In this case, mechanical properties such as impact strength may be excellent, and chemical resistance, processability represented by melt index, and heat resistance may be excellent.

For example, the molded article may include housings for home appliances such as air conditioners, vacuum cleaners, washing machines, refrigerators, and TV back covers; housings for OA equipment such as computers, laptop computers, monitors, facsimiles, telephones, copiers, and scanners; automotive parts such as automotive interior and exterior materials; building interior and exterior materials; parts for toys; and interior decorations, more preferably building exterior materials, most preferably decorative sheets. In this case, by manufacturing the molded article using the thermoplastic resin composition of the present invention, a high-quality product that meets chemical resistance, impact strength, and heat resistance demanded by the market may be provided.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

A-1) A first graft copolymer (core: 50% by weight of a butylacrylate polymer having an average particle diameter of 130 nm, shell: 35% by weight of styrene, 15% by weight of acrylonitrile) prepared by emulsion polymerization A-2) A second graft copolymer (core: 50% by weight of a butylacrylate polymer having an average particle diameter of 500 nm, shell: 35% by weight of styrene, 15% by weight of acrylonitrile) prepared by emulsion polymerization B-1) An SAN resin (97HC, LG Chemical Co.) prepared by bulk polymerization B-2) A heat-resistant SAN resin (98UHM, LG Chemical Co.) prepared by bulk polymerization C-1) A polyolefin elastomer: EBR (LG168, LG Chemical Co.) having a melt index (190° C., 2.16 kg) of 1.2 g/10 minutes, a density of 0.860 to 0.864, and a weight average molecular weight of 90,000 to 110,000 and containing 30 to 40% by weight of butylene was used.

C-2) A polyolefin elastomer: EBR (LC565, LG Chemical Co.) having a melt index (190° C., 2.16 kg) of 5.0 g/10 minutes, a density of 0.863 to 0.867, and a weight average molecular weight of 60,000 to 80,000 and containing 30 to 40% by weight of butylene was used.

C-3) A polyolefin elastomer: EOR (LC150, LG Chemical Co.) having a melt index (190° C., 2.16 kg) of 1.0 g/10 minutes, a density of 0.856 to 0.860, and a weight average molecular weight of 120,000 to 140,000 and containing 30 to 40% by weight of octene was used.

C-4) A polyolefin elastomer: EBR (LC185, LG Chemical Co.) having a melt index (190° C., 2.16 kg) of 1.2 g/10 minutes, a density of 0.883 to 0.887, and a weight average molecular weight of 800,000 to 1.2 million and containing 10 to 20% by weight of butylene was used.

D) Polymethyl methacrylate (BA611, LG MMA Co.)

Examples 1 to 13 and Comparative Examples 1 and 2

According to the components and contents shown in Table 1 below, 0.5 parts by weight of a EBS resin (Sunkoo Chemical Co.) as a lubricant, 0.3 parts by weight of Irganox 1076 (BASF Co.) and 0.3 parts by weight of Irgafos 168 (BASF Co.) as antioxidants, and 0.2 parts by weight of Tinuvin 770 (BASF Co.) as a UV stabilizer were kneaded and extruded at 230° C. to prepare a pellet. The melt index of the prepared pellet was measured. In addition, the prepared pellet was injected at molding temperature of 220° C. to prepare a specimen for measuring physical properties.

Test Examples

The properties of pellets and specimens prepared in Examples 1 to 13 and Comparative Examples 1 and 2 were measured according to the following methods, and results are shown in Table 2 below.

Melt index (MI): The melt index of the prepared pellet was measured under the condition of 220° C./10 kg according to ASTM D1238.

Izod impact strength (kg·cm/cm; IMP): The Izod impact strength of a specimen having a thickness of ¼ inch was measured according to ASTM 256.

Hardness (R-scale): Hardness was measured according to ASTM D785.

Heat deflection temperature (HDT): Heat deflection temperature was measured under the condition of 18.6 kg according to ASTM D648.

Chemical resistance: After dropping methyl ethyl ketone (MEK) as a solvent on a specimen, the degree of melting of the specimen was observed. When the original state of the specimen was maintained for a long time, it was evaluated as ⊚ (very good). When the original state thereof was maintained for 6 hours (appropriate time) and cracking occurred thereafter, it was evaluated as ○ (good). When cracking occurred before the appropriate time, it was evaluated as X (bad).

TABLE 1

| Classification (parts by weight) | A-1) Graft copolymer | A-2) Graft copolymer | B-1) SAN resin | B-2) Heat-resistant SAN resin | C-1) Polyolefin elastomer | C-2) Polyolefin elastomer | D) PMMA |
|---|---|---|---|---|---|---|---|
| Example 1 | 7 | 14 | 64 | 15 | 0.5 | — | — |
| Example 2 | 7 | 14 | 64 | 15 | 1 | — | — |
| Example 3 | 7 | 14 | 64 | 15 | 3 | — | — |
| Example 4 | 7 | 14 | 64 | 15 | 5 | — | — |
| Example 5 | 7 | 14 | 64 | 15 | 10 | — | — |
| Example 6 | 7 | 14 | 64 | 15 | — | 0.5 | — |
| Example 7 | 7 | 14 | 64 | 15 | — | 1 | — |
| Example 8 | 7 | 14 | 55 | 24 | 3 | — | — |
| Example 9 | 7 | 14 | 69 | 10 | 3 | — | — |
| Comparative Example 1 | 7 | 14 | 64 | 15 | — | — | — |
| Comparative Example 2 | 7 | 14 | 64 | 15 | — | — | 0.5 |

TABLE 2

| Classification | MI | IMP | Hardness | HDT | Chemical resistance |
|---|---|---|---|---|---|
| Example 1 | 9.4 | 9.8 | 115.4 | 90.3 | ○ |
| Example 2 | 9.8 | 9.3 | 114.9 | 90.8 | ⊚ |
| Example 3 | 10.4 | 8.9 | 114.2 | 91.1 | ⊚ |
| Example 4 | 11.1 | 7.6 | 113.6 | 91.0 | ⊚ |
| Example 5 | 12.3 | 6.7 | 112.8 | 90.8 | ⊚ |
| Example 6 | 10.3 | 9.3 | 115.7 | 89.8 | ○ |
| Example 7 | 11.1 | 8.7 | 114.6 | 90.4 | ⊚ |

TABLE 2-continued

| Classification | MI | IMP | Hardness | HDT | Chemical resistance |
|---|---|---|---|---|---|
| Example 8 | 10.5 | 8.8 | 114.4 | 92.4 | ◎ |
| Example 9 | 10.1 | 9.1 | 115.5 | 90.4 | ◎ |
| Comparative Example 1 | 9.0 | 8.8 | 116.0 | 89.5 | X |
| Comparative Example 2 | 9.8 | 8.5 | 116.5 | 88.8 | X |

As shown in Tables 1 and 2, it can be confirmed that the thermoplastic resin compositions (Examples 1 to 9) according to the present invention have excellent heat resistance represented by melt index and heat deflection temperature and excellent chemical resistance while having hardness equal or superior to that of Comparative Example 1 not including the polyolefin elastomer according to the present invention and a conventional additive for increasing chemical resistance. In addition, it can be confirmed that the thermoplastic resin compositions (Examples 1 to 9) according to the present invention have excellent heat resistance and chemical resistance while having melt index, impact strength, and hardness equal or superior to those of Comparative Example 2 including a conventional additive for increasing chemical resistance.

In addition, it can be confirmed that Examples 1 to 5 including an ethylene-butene elastomer, as a polyolefin elastomer according to the present invention, containing 30 to 40% by weight of butene and having a weight average molecular weight of 90,000 to 110,000 g/mol and a density of 0.860 to 0.864 exhibit impact strength and heat resistance superior to those of Examples 6 and 7 including an ethylene-butene elastomer containing 30 to 40% by weight of butene and having a weight average molecular weight of 60,000 to 80,000 g/mol and a density of 0.863 to 0.867.

TABLE 3

| Classification (parts by weight) | A-1) Graft copolymer | A-2) Graft copolymer | B-1) SAN resin | B-2) Heat-resistant SAN resin | C-3) Polyolefin elastomer | C-4) Polyolefin elastomer | D) PMMA |
|---|---|---|---|---|---|---|---|
| Example 10 | 7 | 14 | 64 | 15 | 1 | — | — |
| Example 11 | 7 | 14 | 64 | 15 | 3 | — | — |
| Example 12 | 7 | 14 | 64 | 15 | — | 1 | — |
| Example 13 | 7 | 14 | 64 | 15 | — | 3 | — |

TABLE 4

| Classification | MI | IMP | Hardness | HDT | Chemical resistance |
|---|---|---|---|---|---|
| Example 10 | 9.7 | 9.5 | 114 | 89.5 | ◎ |
| Example 11 | 10.2 | 9.4 | 113.5 | 89.1 | ◎ |
| Example 12 | 9.7 | 9.0 | 115.2 | 89.6 | ◎ |
| Example 13 | 10.3 | 8.7 | 115 | 89.4 | ◎ |

As shown in Tables 3 and 4, as in Examples 1 to 9, it can be confirmed that the thermoplastic resin compositions (Examples 10 to 13) according to the present invention exhibit excellent melt index and chemical resistance while having hardness and heat resistance equal or superior to those of Comparative Example 1. In addition, it can be confirmed that the thermoplastic resin compositions (Examples 10 to 13) exhibit excellent heat resistance and chemical resistance while having melt index, impact strength, and hardness equal or superior to those of Comparative Example 2.

The invention claimed is:

1. A thermoplastic resin composition, comprising:
   100 parts by weight of a base resin consisting of an acrylate-aromatic vinyl compound-vinyl cyanide compound graft copolymer (A-1) containing acrylate rubber having an average particle diameter of 0.05 to 0.15 μm as a core, an acrylate-aromatic vinyl compound-vinyl cyanide compound graft copolymer (A-2) containing acrylate rubber having an average particle diameter of 0.3 to 0.6 μm as a core, an aromatic vinyl polymer (B-1), and a heat-resistant aromatic vinyl polymer (B-2); and
   0.5 to 10 parts by weight of a polyolefin elastomer (C),
   wherein the thermoplastic resin composition has a heat deflection temperature (HDT) of 89° C. or more,
   wherein a weight ratio of the graft copolymer (A-1) to the graft copolymer (A-2) is 1:1.1 to 1:5,
   wherein the aromatic vinyl polymer (B-1) is a styrene-acrylonitrile copolymer,
   wherein the heat-resistant aromatic vinyl polymer (B-2) is an aromatic vinyl polymer comprising one or more selected from the group consisting of alpha-methylstyrene and maleimide-based compounds as a heat-resistant monomer, and
   wherein the polyolefin elastomer (C) is one or more selected from ethylene-alpha-olefin copolymers.

2. The thermoplastic resin composition according to claim 1, wherein the graft copolymer (A-1) is contained in an amount of 1 to 30% by weight, the graft copolymer (A-2) is contained in an amount of 5 to 50% by weight, the aromatic vinyl polymer (B-1) is contained in an amount of 40 to 85% by weight, and the heat-resistant aromatic vinyl polymer (B-2) is contained in an amount of 5 to 50% by weight.

3. The thermoplastic resin composition according to claim 1, wherein the graft copolymer (A-1) and the graft copolymer (A-2) independently comprise 40 to 60% by weight of acrylate rubber, 25 to 45% by weight of an aromatic vinyl compound, and 10 to 20% by weight of a vinyl cyanide compound.

4. The thermoplastic resin composition according to claim 1, wherein the polyolefin elastomer (C) has a melt index (190° C., 2.16 kg) of 0.3 to 20 g/10 minutes.

5. The thermoplastic resin composition according to claim 1, wherein the thermoplastic resin composition has an Izod impact strength (¼ inch, ASTM D1238) of 6 kg·cm/cm or more.

6. The thermoplastic resin composition according to claim 1, wherein the thermoplastic resin composition has a melt index (220° C., 10 kg) of 9 g/10 minutes or more.

7. A molded article, comprising the thermoplastic resin composition of claim 1.

8. A method of preparing a thermoplastic resin composition, the method comprising:
   kneading and extruding, under conditions of 200 to 330° C. and 100 to 500 rpm, 100 parts by weight of a base resin consisting of an acrylate-aromatic vinyl compound-vinyl cyanide compound graft copolymer (A-1) containing acrylate rubber having an average particle diameter of 0.05 to 0.15 µm as a core, an acrylate-aromatic vinyl compound-vinyl cyanide compound graft copolymer (A-2) containing acrylate rubber having an average particle diameter of 0.3 to 0.6 µm as a core, an aromatic vinyl polymer (B-1), and a heat-resistant aromatic vinyl polymer (B-2); and 0.5 to 10 parts by weight of a polyolefin elastomer (C), wherein the thermoplastic resin composition has a heat deflection temperature (HDT) of 89° C. or more, wherein a weight ratio of the graft copolymer (A-1) to the graft copolymer (A-2) is 1:1.1 to 1:5, wherein the aromatic vinyl polymer (B-1) is a styrene-acrylonitrile copolymer, wherein the heat-resistant aromatic vinyl polymer (B-2) is an aromatic vinyl polymer comprising one or more selected from the group consisting of alpha-methylstyrene and maleimide-based compounds as a heat-resistant monomer, and wherein the polyolefin elastomer (C) is one or more selected from ethylene-alpha-olefin copolymers.

9. A thermoplastic resin composition, comprising:

100 parts by weight of a base resin consisting of 1 to 30% by weight of an acrylate-aromatic vinyl compound-vinyl cyanide compound graft copolymer (A-1) containing acrylate rubber having an average particle diameter of 0.05 to 0.15 µm as a core, 5 to 50% by weight of an acrylate-aromatic vinyl compound-vinyl cyanide compound graft copolymer (A-2) containing acrylate rubber having an average particle diameter of 0.3 to 0.6 µm as a core, 40 to 85% by weight of an aromatic vinyl polymer (B-1), and 5 to 50% by weight of a heat-resistant aromatic vinyl polymer (B-2); and 0.5 to 10 parts by weight of a polyolefin elastomer (C), wherein a weight ratio of the graft copolymer (A-1) to the graft copolymer (A-2) is 1:1.1 to 1:5, wherein the aromatic vinyl polymer (B-1) is a styrene-acrylonitrile copolymer, wherein the heat-resistant aromatic vinyl polymer (B-2) is an aromatic vinyl polymer comprising one or more selected from the group consisting of alpha-methylstyrene and maleimide-based compounds as a heat-resistant monomer, and wherein the polyolefin elastomer (C) is one or more selected from ethylene-alpha-olefin copolymers.

* * * * *